United States Patent [19]

Kaw et al.

[11] 3,779,864
[45] Dec. 18, 1973

[54] EXTERNAL CONTROL OF ION WAVES IN A PLASMA BY HIGH FREQUENCY FIELDS

[75] Inventors: Predhiman K. Kaw, Ahmedabad, India; John M. Dawson, Princeton, N.J.

[73] Assignee: The United States of America as represented by the United States Atomic Energy Commission, Washington, D.C.

[22] Filed: Oct. 29, 1971

[21] Appl. No.: 193,749

[52] U.S. Cl............................ 176/1, 176/3, 176/7, 315/111
[51] Int. Cl. ............................................ G21b 1/00
[58] Field of Search .................................... 176/1–8

[56] References Cited
UNITED STATES PATENTS

| | | | |
|---|---|---|---|
| 3,663,361 | 5/1972 | Yoshikawa............................ | 176/3 |
| 3,702,163 | 11/1972 | Furth et al. ............................ | 176/3 |
| 3,677,890 | 7/1972 | Hartwan ................................ | 176/1 |
| 3,022,236 | 2/1962 | Ulrich et al............................ | 176/1 |
| 3,031,399 | 4/1962 | Warnecke et al...................... | 176/2 |
| 3,052,614 | 9/1962 | Herold.................................. | 176/2 |
| 3,160,566 | 12/1964 | Dandl et al............................. | 176/1 |
| 3,257,283 | 6/1966 | Hamberger............................. | 176/3 |
| 3,668,066 | 6/1972 | Hendel et al. ......................... | 176/5 |
| 3,668,068 | 6/1972 | Watson.................................. | 176/7 |

OTHER PUBLICATIONS

Science, Vol. 167, Feb. 20, 1970, pp. 1112, 1113 (Q1.534)

Primary Examiner—Reuben Epstein
Attorney—John A. Horan

[57] ABSTRACT

Apparatus and method for stabilizing plasma instabilities, in a magnetically confined plasma column by transmitting into the plasma high frequency electromagnetic waves at a frequency close to the electron plasma frequency. Said frequencies, e.g., are between the plasma frequency and 1.5 times said plasma frequency at a power level below the level for producing parametric instabilities in a plasma having temperatures from below 10 ev to about 10 KeV or more, at densities from below $10^{13}$ to above $10^{18}$ particles/cm$^3$. In another aspect, this invention also provides a plasma diagnostic.

8 Claims, 2 Drawing Figures

INVENTORS
PREDHIMAN K. KAW
JOHN M. DAWSON

EXTERNAL CONTROL OF ION WAVES IN A PLASMA BY HIGH FREQUENCY FIELDS

Cross-reference to related applications, which have all been assigned to the assignee of this application:

U.S. application Ser. No. 12,309, "Plasma Control by Feedback" Hans Hendel et al. 2/18/70.

U.S. application Ser. No. 12,310, "Dynamic Stabilizer For Plasma Instabilities To Improve Plasma Confinement And To Increase Plasma Density" Hans Hendel et al. 2/18/70, now U.S. Pat. No. 3,668,066.

U.S. application Ser. No. 130,368, "The Production Of Plasmas By Longwavelength Lasers" John M. Dawson 4/1/71.

BACKGROUND OF THE INVENTION:

This invention was made in the course of, or under a contract with the United States Atomic Energy Commission. As will be understood from the following, this application is an improvement on the subject-matter of the above-mentioned co-pending Dawson application, which is assigned to the assignee of this application.

In the field of physics a need exists for heating and stably confining a plasma of ions and electrons. The systems proposed or used heretofore for heating a plasma such as described in the abovementioned Dawson application, have comprised linear and/or toroidal magnetic field means having electromagnetic radiation means around the circumference of a vacuum chamber for heating the plasma by producing parametric instabilities at specific power levels and frequencies close to or above the plasma frequency. It has been discovered in accordacne with this invention that such specific frequencies below the threshold for producing these parametric instabilities, can be advantageously used to stabilize the plasma by suppressing other well-known instabilities therein.

It is an object of this invention, therefore, to provide plasma stabilization and control;

It is another object to reduce plasma instabilities;

It is another object externally to control a plasma that is magnetically confined in a vacuum chamber;

It is a further object to control the frequency and damping of ion waves in a plasma;

It is a still further object to provide a plasma diagnostic means and method.

SUMMARY OF THE INVENTION:

This invention provides improved plasma confinement and control of plasma instabilities by transmitting into a magnetically confined plasma column high frequency fields with frequency near the plasma frequency ($\omega_p < \omega 1.5\omega$). In this regard a specific plasma and frequency are employed between the plasma frequency and 1.5 times the plasma frequency. More particularly this invention employs specific high-frequency electromagnetic waves at a strength less than that required to excite parametric instabilities in the plasma column confined in the magnetic field. In one embodiment, this invention transmits electromagnetic microwave radiation having a frequency of $4 \times 10^4$ Mhz at about 300 Watts/cm$^2$ into a magnetically confined plasma having a density of 1 to $2 \times 10^{13}$ particles/cm$^3$ at a temperature of 10 ev to 10 KeV. As the plasma frequency depends on electron density, however, this invention in the broad aspect thereof, employs a specific wavelength up to the longwavelengths provided at laser light frequencies for stabilizing high density plasmas. For example, this invention employs $CO_2$ laser light frequencies of 10.6 $\mu$m to stabilize high density plasmas up to $10^{18}$ particles/cm$^3$ at laser power levels below those for exciting parametric instabilities in the plasma. As such, since this invention employs the longwavelength laser light wave frequencies described in co-pending application Ser. No. 130,368, filed Apr. 1, 1971, by the co-inventor herein, this invention is an improvement derived from of said earlier co-pending application. With the proper selection elements and steps as described in more detail hereinafter, the desired stable plasma confinement of a high temperature plasma is achieved.

The above and further novel features and objects of this invention will become apparent from the following detailed description when the same is read in connection with the accompanying drawing, and the novel features will be pointed out in the connection with the appended claims.

BRIEF DESCRIPTION OF THE DRAWING:

In the drawing where like elements are referenced alike.

DETAILED DESCRIPTION OF THE PREFERRED EMBODIMENT:

This invention is particularly useful in externally controlling, supressing and diagnosing the low frequency plasma instabilities that are known to occur in magnetically confined plasma columns. Such columns have long been known and studied by plasma physicists and experimentalists in the field of controlled thermonuclear fusion research. These plasma instabilities are described in the above-cited co-pending applications, which are incorporated by reference herein. As understood from those co-pending applications, these low frequency instabilities occur in a wide variety of linear and toroidal plasma columns. Thus, this invention is useful in externally controlling, suppressing and diagnosing the low frequency instabilities that occur in any of a wide variety of the heretofore known devices for magnetically confining a plasma column. These devices, such as stellarators, and magnetic mirrors, are described in "Controlled Thermonuclear Reactors" by Samuel Glasstone and Ralph H. Lovberg, Van Nostrand Co., Inc., N.Y. 1960. More recent reactors, devices and systems with which this invention are useful are the tokamaks at Princeton University, the Oak Ridge National Laboratory and the Massachusetts Institute of Technology. For ease of explanation, several embodiments of this invention will be described in connection with a typical linear device, such as the Q-machine described in the above-cited co-pending applications, and typical toroidal devices, such as the ST tokamak derived from the C stellarator at Princeton University. However, as will be understood by one skilled in the art, this invention may be used with any magnetically confined minimum B minimum average B, or high or low B plasma column, as those terms are understood in the art. As such, this invention is an improvement on the heretofore known devices and methods, such as those contemplated in the above-mentioned disclosures. In this regard, moreover, this invention is particularly useful in stabilizing the non-parametric instabilities described in the above-mentioned Dawson application, the disclosure thereof being incorporated by reference in this disclosure.

Figure 1:
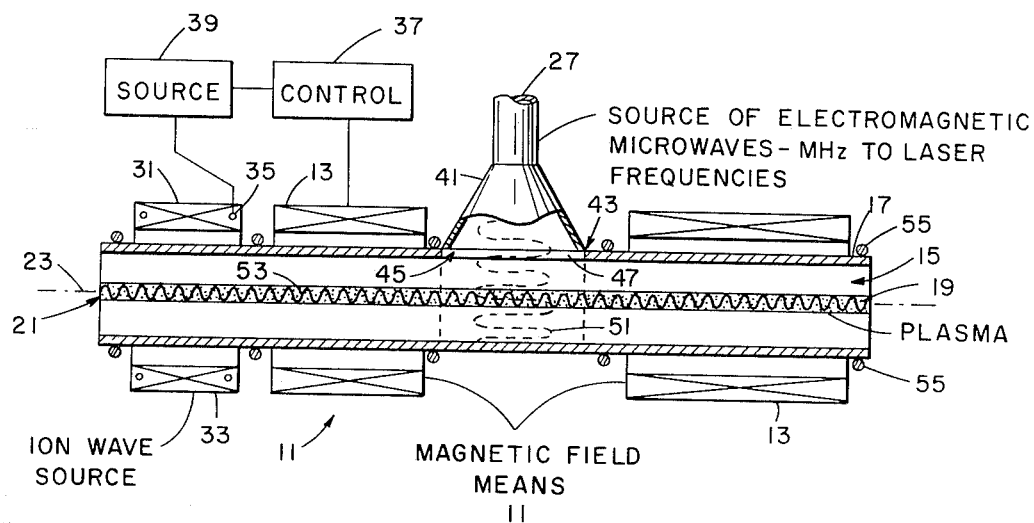
FIG. 1 is a partial cross-section of one embodiment of a plasma confinement device, illustrating the apparatus of this invention.

Referring to FIG. 1, a portion of a conventional plasma column is shown, such as is present in the Q-machine at Princeton University. In this regard, magnetic means 11, such as a solenoid 13, surrounds a vacuum chamber 15, which is enclosed by a suitable container, such as a cylindrical container 17. This solenoid 13 comprises room temperature normal resistance conductors and/or conventional cryogenically cooled normal resistance conductors or stabilized superconductors at suitable low temperatures. Suitable pulsed, alternating, flat topped or constant current sources energize the solenoid 13 to confine a plasma 19 that is produced in container 17 by conventional means in a plasma column 21 along the axis 23 of the cylindrical container 17. When an axial solenoidal magnetic field B is produced by solenoid 13 along axis 23 low frequency plasma instabilities occur in the plasma 19 in column 21, thereby to decrease the effectiveness of the magnetic confinement of the plasma 19. In this regard, as is well known in the art, these plasma instabilities decrease the plasma density, confinement time, and temperature by the cooling of the plasma as the plasma particles strike the inside wall of container 17 in accordance with the amplitude of the described low frequency plasma instabilities.

The plasma 19 in column 21 is produced and heated by any of a variety of well known in situ formation or injection means. Thus, the production and heating of plasma 19 will be described simply herein, as this plasma production and heating will be understood by one skilled in the art. For example, the plasma 19 is advantageously heated and injected by atom beam ovens, as described and shown in FIG. 1 of the above-mentioned co-pending Hendel application on dynamic plasma stabilization, but it is likewise understood by one skilled in the art that the plasma 19 can be formed and/or raised in temperature by ohmic or rf heating of a gas in container 17, as described in U.S. Pat. Nos. 3,016,341 and 3,015,618; by injection of suitable materials into a magnetically confined plasma column, such as by injecting a neutral or molecular beam into a plasma column confined by a magnetic mirror as described on page 377 et seq. of "Plasmas and Controlled Fusion" by D. Rose and M. Clark, Jr., M.I.T. Press, 1961; by laser heating, as described in co-pending application Ser. No. 130,368, filed Apr. 1, 1971 by John M. Dawson; or by the linear or toroidal pinches described in the above-cited Glasstone publication. Still another suitable plasma heating means, is the adiabatic toroidal compressor means that is being built at Princeton University. This (ATC) plasma heating means is shown and described in U.S. Pat. No. 3,702,163.

It will also be understood by one skilled in the art, that the magnetically confined plasma instabilities controlled, suppressed and diagnosed by this invention, occur in plasmas whose constituents are electrons and any of a wide variety of ions, but advantageously comprise deuterium and/or tritium ions. Thus, hydrogen ions, helium ions, and ions having higher Z's (atomic weight) than He may be used to form the magnetically confined plasma in which instabilities are externally controlled, suppressed and/or diagnosed in accordance with this invention.

In understanding this invention, means 27 introduces into plasma column 21 high-frequency electromagnetic waves having a strength below the threshold required for the excitation of parametric instabilities. This contrasts to the power levels for heating the plasma by creating parametric instabilities, as discussed in the above-mentioned co-pending application by the co-inventor of this application. As will be understood hereinafter, the transmittal of these electromagnetic waves below this threshold in plasma column 21 in a direction transverse to the axis 23 in container 17 is at a specific frequency between the plasma frequency and 1.5 times the plasma frequency in accordance with this invention. To this end, these waves have a significant influence on the plasma dispersion relation. In this regard, the possible use of high frequency fields for exciting parametric instabilities in a plasma was discussed in the "Physics of Fluids," Vol. 14, No. 4, April 1971, page 792. However, it is not well appreciated that even when the high frequency field has a strength below the threshold required for the excitation of instability, its influence on the plasma dispersion relation can be quite remarkable. In accordance with this invention, therefore, means 27 introduces into plasma 19 high-frequency electromagnetic waves with a specific frequency close to the electron plasma frequency, and a strength in the sub-threshold regime for parametric instabilities externally to control the frequency and damping of ion waves in the plasma in a significant manner by introducing into plasma 19 the high frequency fields of this invention. Moreover, since certain high frequency fields can produce instabilities, they can also provide diagnostic means in accordance with this invention as described in more detail hereinafter. In this regard, for example stable ion waves can be produced, made unstable, and vice versa. By measuring the damping of ion waves of definite wavelength as a function of the external high frequency field strength, one can obtain important information about the slope of the distribution function of the ion velocities in a simple manner. Thus, the velocity distribution function can be determined and investigated.

A mathematical analysis of the above is provided in 14, 792 – 794, The Physics of Fluids, April 1971, wherein the starting point of the analysis is the Vlasov system of equations for homogeneous plasma in the presence of a uniform, externally applied, high-frequency electric field. In analyzing ion waves in such a plasma, it is shown that one is able to change the magnitude of the frequency, from its characteristic ion-acoustic value all the way down to zero. Thus, one can essentially sweep the ion-wave phase velocity in and out of the ion distribution, by adjusting the magnitude of the applied high-frequency field. Similarly, one moves the ion wave further out of the ion distribution function, by application of the high-frequency field.

On the other hand, as the ion wave phase velocity moves into the ion distribution function, the ion Landau damping of the wave becomes the dominant damping mechanism.

The fact that one can sweep the ion wave frequencies in and out of the ion distribution function by external high-frequency fields has several interesting consequences. One can thus achieve a suppression of unstable ion waves (instability due to some independent mechanism) by moving the ion wave frequencies into the ion distribution function, where they will be heavily Landau-damped by the ions. In a similar manner, one can achieve stabilization of collisionless drift waves by increasing their frequency. Under suitable conditions one can also do the reverse: cause the stable ion waves to become unstable. Finally, by measuring the damping of an ion wave of definite wavelength as a function of the external high-frequency field strength, one can obtain important information about the slope of the distribution function of ion velocities in a simple manner. This, therefore, provides a diagnostic method in accordance with the invention for the investigation of the velocity distribution function.

To get an idea of the order of magnitude of the high-frequency fields needed for this invention, one uses the following approximate relation (14):

$$P \approx 10^2 \, (N_{12}{}^3/\, T)^{1/2} \text{ Watts/cm}^2, \quad (14)$$

where $P$ is the power density, $N_{12}$ is the density in units of $10^{12}$ cm$^{-3}$, and $T$ is the temperature in electron volts. Thus, for a 10-volt plasma at $10^{12}$ particles/cm$^3$, one needs only 30 watts/cm$^2$ at a 3-cm wavelength.

In the operation of an embodiment of FIG. 1, the plasma 19 is magnetically confined in a column 21 in an evacuated container 17 ($10^{13}$ to $10^{14}$ particles/cm$^3$) at a temperature of 1 kilovolt, but another suitable column 21 is provided in a typical Q machine having a uniform magnetic field strength, e.g., 1,000 gauss. Thereupon, ion waves are generated in plasma 19 by means 31, which may comprise any of a large number of well known systems and/or elements. One suitable means 31 is a conventional coil 33, which may be part of or separate from the described system of solenoid 13. In this regard, coil 33 may comprise a wire gauze that is arranged around column 21 and connected to a suitable high frequency source of current having a frequency at the plasma ion frequency, e.g., 10–100 megahertz. In the example of the apparatus of FIG. 1 that is described herein, coil 33 has a conductor 35, symmetrically wound around the outside diameter of plasma 19, coaxial with the axis 23 of container 17. By sequentially pulsing the conductor 35 from a suitable current source, such as is well known in the art, the magnetic field produced in plasma 19 is sequentially increased above the strength of the magnetic field produced in plasma 19 by solenoid 13. To this end a control means 37 connected to a suitable current source 39 maintains a desired uniform direct current in solenoid 13 and conductor 35, and thereafter maintains in conductor 35 a periodic, sequentially increasing smoothly varying current corresponding to a current wave having an amplitude that sequentially varies from the current value in solenoid 13 to a value above that in solenoid 13. The means 31, thus produces an alternate compression and expansion of the plasma 19 that results in an externally controlled ion wave that propogates down column 21 with a controlled amplitude and wave length.

Thereupon the high frequency source means 27 transmits suitable electromagnetic wave energy at a suitable frequency into plasma 19 in column 21, e.g. through a suitable horn shaped antenna 41 that is connected to the outside 43 of container 17 in a vacuum tight manner, whereby high frequency electromagnetic microwaves pass through a cutout portion 45 forming at least one slot 47 in the side of container 17. This slot 47 will be understood in the art as being of a suitable shape and size efficiently to couple the high frequency microwaves from source means 27 into the plasma 19. One suitable slot shape and size for relatively low density plasmas and relatively low frequency microwaves corresponds to those provided by the Lisitano coil described by Lisitano in MATT-Q-23 and MATT-Q-24, which states that the characteristics of the plasma produced by high frequency fields are favorable for studies of plasma waves, diffusion, stability and turbulence.

Advantageously, the electromagnetic microwaves of this invention enter the plasma 19 from high frequency source means 27 transverse to the axis of column 21 at a frequency corresponding to close to the electron plasma frequency of the plasma 19 in column 21. In the example of this invention described herein in connection with FIG. 1, the frequency of these microwaves from source means 27 is between 1,000 and 10,000 megahertz, as determined by the plasma frequency, which in turn corresponds to the plasma density. As understood in the art, this frequency is 100 to 1,000 times more than the ion cylotron frequency of the plasma 19 in the column 21. An example of the parameters for the plasma column 21 of FIG. 1 (e.g., in a Q machine) are provided in the following TABLE I:

TABLE I:

Q-Machine
1. Electron density — $10^{10}$ cm$^{-3}$
2. Electron temperatures — 1/5 eV
3. Frequency of external high frequency field — $10^3$ MHz
4. Power density req. — 0.2 Watts/cm$^2$ The value of the above-mentioned power density requirement corresponds to the Eq. (14). The power requirements for fusion conditions are high and will go up with increasing plasma density. However, they are still within acceptable limits.

In one example employing the parameters of Table I and a power density derived from the above-mentioned equation 14, this invention transmits into a magnetically confined plasma column 21 electromagnetic wave energy from the described externally applied high frequency microwaves, which are illustrated for ease of explanation as waves 51, transverse to the axis of the plasma column, to the significant effect of reducing toward zero the amplitude and wave length of the described ion waves, which are illustrated for ease of explanation by shading 53.

While the above has prominently referred to a plasma column in a conventional Q machine, such a plasma column 21 is interchangeable with a conventional stellarator plasma column. Thus, the well-known plasma column in a conventional stellarator having shear can be stabilized in accordance with this invention. In this regard, the above-mentioned power requirements corresponding to Eq. (14) are also high for fusion conditions and will go up with increasing plasma density. However, they again are still within acceptable limits.

In the operation of this invention with a stellarator, the high frequency source means 27 of this invention transmits the described high frequency electromagnetic waves 51 into the plasma 19 of a conventional plasma column 21 in a stellarator, which has shear due to helical windings 55 around the plasma column. For ease of explanation, these helical windings are added to the above-described axial solenoid, which is made to encircle an endless, toroidal, plasma column 21, such as is conventional in a stellarator. Thereupon, the high frequency waves 51 of this invention are used as an additive mechanism for stabilization of the drift waves in the endless plasma column 21 by stabilizing whatever is left unaccomplished by the magnetic shear of the helical windings of the stellarator. Thus, this invention reduces the power requirements from the values that would otherwise be required without the stellarator shear.

Figure 2:
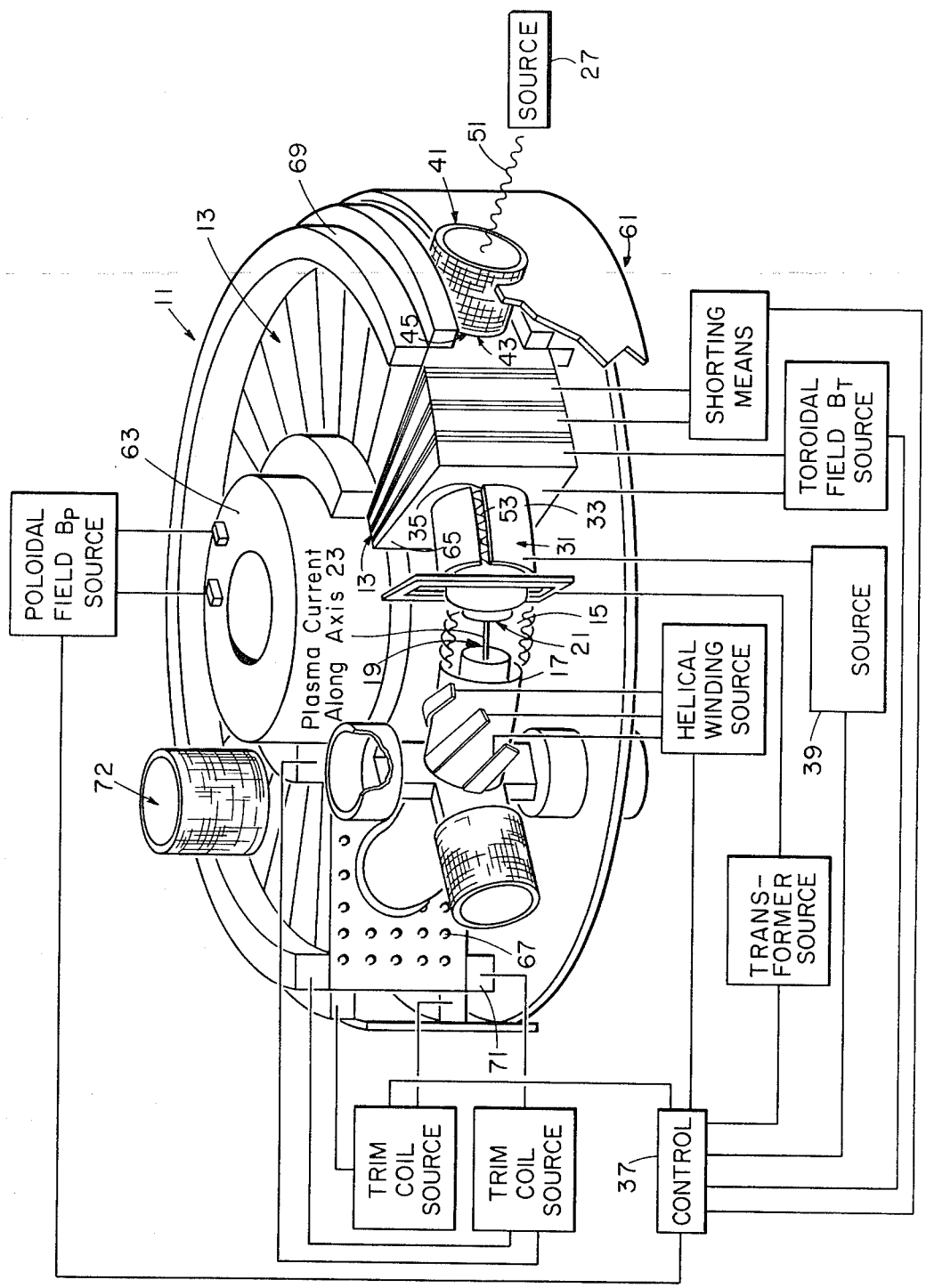
FIG. 2 is a three dimensional view of another embodiment of a plasma confinement means, illustrating the apparatus of this invention.

Referring now to FIG. 2, in another embodiment of this invention a typical tokamak 61 is illustrated with which the apparatus and method of this invention may be used. One such tokamak, is the tokamak at Princeton University, but the tokamak at M.I.T., the Oak Ridge National Laboratory or any other location can be used with this invention. In this regard, as is well known, the tokamak at Princeton University employs components from the C stellarator described in Project Matterhorn Report PM-529(NYO-7,899) (1957). These components, comprise the axial field coil elements, power source means, plasma source means, and a like confinement tube, which, however, is symmetrical-circular, rather thatn race-track shaped as in the C stellarator.

In review of the components and operation of the tokamak 61, it advantageously has an axial field coil solenoid 13 around an endless vacuum container 15 having a low aspect ratio of major radius R to minor radius a. Also, it has a high plasma current. To this end, poloidal coils, an iron-core transformer, or an air core solenoid 63 is employed in the annulus at the center of container 17, such as described in co-pending application SR. No. 11,994, filed Feb. 17, 1970 by Yoshikawa, now U.S. Pat. No. 3,663,361 and/or 123,319, filed Mar. 11, 1971 by Coppi et al.. The iron core transformer is employed in the T-3 tokamak, and the poloidal coils are used in the ATC at Princeton University. The axial field coils of the solenoid 13 comprise, simple stellarator type coils or interleaved copper plates 65 having interfitting dimples 67 and restraining rings 69, such as the glass-fiber reinforced polymer rings described in the mentioned co-pending Coppi et al. application. Helical ($l=2$) windings 55 are optional. Trim coils 71, and poloidal coils, since they are understood in the art, will not be described in great detail herein, particularly since they are designed in a well-known manner to heat and to center plasma 19 in an endless plasma column 21.

In operation, high frequency source means 27 introduces high frequency waves 51 into plasma 19 in column 21 to reduce down to zero therein the amplitude and wave length of the conventional drift waves in column 21, such as are well known in the art. An example of the parameters for the embodiment of the tokamak of FIG. 2 are provided in the following table II;

TABLE II

Tokamak
1. Electron density (1 to $2\times10^{13}$ cm$^{-3}$)   $2\times10^{13}$ cm$_i^3$
2. Electron temperature (10 ev ~10·KeV)   1 KeV
3. Frequency of externally applied high frequency field (waves 51)   $4\times10^4$ Mhz
4. Power density required (waves 51)   (100 to 300 watts/cm$^2$)   ~300 watts/cm$^2$ As will be understood in the art, the density of the plasma 19 in column 21 can be increased by any of a wide variety of means For example, the density of this plasma 19 can be increased by adiabatic compression, as described in U.S. Pat. No. 3,702,163 and/or neutral beam injection and laser heating, as described in another co-pending application Ser. No. 155,012, filed June 21, 1971 by Haught et al. Also, laser means can be used to heat the plasma,. It will be understood that the plasma frequency increases as the density increases. Accordingly, the wave injection frequency required in accordance with this invention for stabilizing the plasma, correspondingly increases as the density is increased. To this end, this invention contemplates a suitable electromagnetic, longwavelength source means 27, such as the $CO_2$ laser light system for transmitting laser light at 10.6 $\mu$ into the plasma column described in the abovementioned co-pending application by Dawson,. In this regard, however, it is noted that the laser light energy for stabilizing the plasma 19 in column 21 in accordance with this invention is advantageously between the plasma frequency and 1.5 times the plasma frequency, and has a power level below that for producing parametric instabilities in the plasma 19. Alternately, the $CO_2$ laser described in U.S. Pat. No. 3,596,202, or the well-known continuously operating $CO_2$ lasers, or other longwavelength lasers can be used for stabilizing the plasma 19 in accordance with this invention.

In still another aspect this invention can be used for the diagnosis of the plasma 19 in column 21, which is provided in the above-described embodiments of FIG's. 1 and 2, or any other suitable linear or toroidal plasma research reactor, such as known in the art and described in the above-mentioned publications. In this regard, the desired ion waves 53 are produced in plasma 19 by ion wave means 31 and the frequency and amplitude of these ion waves 53 is controlled by the high frequency waves 51 from high frequency means 27, as described above. Thereupon, the frequency and/or amplitude of these ion waves 53 is determined by suitable diagnostic means 72, such as the Langmuir probes described in U.S. Pat. Nos. 3,580,802 by Johnson et al, or 3,171,788 by Gorman et al. Other allied diagnostic means comprise any of the conventional plasma diagnostic means used heretofore in plasma research, comprising the microwave interferometers, loss detectors, spectroscopes, soft or hard x-ray detectors, target insertion means, and synchrotron emission detectors, such as are mentioned in paper CN 28/A-3 for the IAEA conference June 1971, Madison, Wisconsin, and/or the systems described in U.S. Pat. Nos. 3,316,412; 3,300,640; 3,265,967; and 3,171,788, or the papers published in the 1969 Noosibirisk or 1965 Belgrade Conferences or the IAEC Bibliog. Series No. 35.

In operation, the described diagnostic of this invention detects the changes in frequency and amplitude of the described ion waves 53, thus to determine the slope of the distribution function of the ion velocities in plasma 19 in a simple manner. Thus, the velocity distribution function of these ions in plasma 19 can be determined and investigated.

This invention has the advantage or providing means for controlling and stabilizing a magnetically confined plasma column by transmitting high frequency electromagnetic waves into the plasma at a frequency at or close to the electron plasma frequency, i.e., between the plasma frequency and 1.5 times said plasma frequency, and at an amplitude below that for producing parametric instabilities. In a stellarator having magnetic shear, this invention has an additive effect where with the shear it reduces the power level required for stabilizing drift waves in the plasma. In another aspect, this invention stabilizes drift waves, and ion waves in either linear or toroidal magnetically confined plasma columns. Additionally, this invention provides a plasma diagnostic. Still further, microwaves from the low Megahertz frequency range to the laser light frequency range are used in accordance with this invention for stabilizing the plasma at a level below that required for parametric instability production and heating.

What is claimed is:

1. In a method for controlling positive-ion oscillations of the type known as ion acoustic waves in a plasma of ions and electrons having means for injecting into the plasma electromagnetic radiation at frequencies close to or above the electron plasma frequency of the plasma at amplitudes up to those for producing parametric instabilities in the plasma, the improvement comprising the steps of:
   a. producing in said plasma positive ion oscillations of the type known as ion acoustic waves at an ion acoustic frequency below said electron plasma frequency;
   b. controlling the amplitude of the injected electromagnetic radiation to have a strength less than that required to excite said parametric instabilities in said plasma;
   c. injecting said electromagnetic radiation into said plasma at a frequency between the plasma frequency and 1.5 times the plasma frequency in a direction transverse to the plasma column at a power level below the threshold level for exciting said parametric instabilities in said plasma, the magnitude of the high frequency field conforming to the approximate relation $P \approx 10^2 (N_{12}^3/T)^{1/2}$ watts/cm$^2$ where $P$ is the power density, $N_{12}$ is the density in units of $10^{12}$ cm$^{-3}$, and $T$ is the temperature in electron volts frequency; and
   d. controlling the frequency of said electromagnetic radiation for providing a frequency that selectively couples said ion acoustic waves and said electron plasma frequency to control the phase velocity of said ion acoustic waves in said plasma, said frequency selectively reducing the phase velocity of said ion acoustic waves when the frequency of said electromagnetic radiation is less than the sum of said ion acoustic frequency and said electron plasma frequency, and said frequency selectively increasing the phase velocity of said ion acoustic waves when the frequency of said electromagnetic radiation is greater than the sum of said electron plasma frequency and said ion acoustic frequency.

2. The method of claim 1, in which the plasma is magnetically confined along an endless axis in a toroidal plasma column at a density of from 1 to $2 \times 10^{13}$ cm$^{-3}$ at a temperature of 1 kilovolt, and said electromagnetic radiation is transmitted into said homogeneous plasma at a frequency of $4 \times 10^4$ Mhz at a power level of 300 Watts/cm$^2$ for selectively effecting the stabilizing of said plasma.

3. The method of claim 2, in which said electromagnetic radiation has a frequency 1.5 times the plasma frequency.

4. The method of claim 1, in which laser light is continuously directed into said plasma at a wavelength of at least $10.6\mu$ for injecting said electromagnetic radiation into said plasma.

5. The method of claim 1 in which said electromagnetic radiation is transmitted into a longitudinally extending portion of an endless plasma column through an antenna directed transverse to the axis of said endless plasma column.

6. The method of claim 1 in which said plasma is magnetically confined along an endless axis in a toroidal plasma column having magnetic shear due to a plasma heating current therein of the type that tends to produce instabilities in said toroidal plasma column due to the presence of said ion acoustic waves therein, said instabilities tending to be stabilized by said magnetic shear, and said electromagnetic radiation is selectively injected into said plasma in said toroidal plasma column selectively to maintain a stabilizing effect on said instabilities in said toroidal plasma column.

7. The method of claim 6 including the steps of selectively stabilizing said ion waves in said plasma, and then making the plasma unstable in accordance with the power level and frequency of said electromagnetic radiation.

8. The method of claim 7, in which said injecting of said electromagnetic radiation into said plasma is at a frequency that can be detected to provide a diagnostic for the plasma frequency, the plasma current, the ion distribution function and the ion drift velocities in said toroidal plasma column.

* * * * *